United States Patent
Shibuya

(10) Patent No.: US 8,603,673 B2
(45) Date of Patent: Dec. 10, 2013

(54) NEGATIVE ELECTRODE COMPRISING VAPOR GROWN CARBON FIBER AND POLYMER MATERIALS AND NONAQUEOUS ELECTROLYTE SECONDARY BATTERY

(75) Inventor: Mashio Shibuya, Fukushima (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 12/753,237

(22) Filed: Apr. 2, 2010

(65) Prior Publication Data

US 2010/0261057 A1    Oct. 14, 2010

(30) Foreign Application Priority Data

Apr. 8, 2009    (JP) .................................. 2009-094075

(51) Int. Cl.
*H01M 4/13*    (2010.01)
*H01M 4/62*    (2006.01)

(52) U.S. Cl.
USPC .......................... 429/217; 429/232; 252/182.1

(58) Field of Classification Search
USPC .............. 429/303, 338, 231.8, 326, 342, 207, 429/329, 218.1, 57, 245, 246, 306, 232, 429/217; 252/182.1
See application file for complete search history.

(56) References Cited

U.S. PATENT DOCUMENTS

| | | | |
|---|---|---|---|
| 5,749,927 A * | 5/1998 | Chern et al. | 29/623.5 |
| 2003/0175583 A1* | 9/2003 | Suzuki | 429/57 |
| 2005/0221170 A1* | 10/2005 | Takeuchi et al. | 429/122 |
| 2006/0035149 A1* | 2/2006 | Nanba et al. | 429/218.1 |
| 2006/0166098 A1* | 7/2006 | Tabuchi et al. | 429/232 |
| 2007/0020524 A1* | 1/2007 | Kim et al. | 429/245 |
| 2007/0141469 A1* | 6/2007 | Tokunaga et al. | 429/231.3 |
| 2007/0298322 A1* | 12/2007 | Yamamoto et al. | 429/218.1 |
| 2008/0248394 A1* | 10/2008 | Inoue et al. | 429/232 |
| 2008/0292969 A1* | 11/2008 | Mori et al. | 429/303 |

FOREIGN PATENT DOCUMENTS

| | | |
|---|---|---|
| JP | 63-121264 | 5/1988 |
| JP | 04-255670 | 9/1992 |
| JP | 08-315817 | 11/1996 |
| JP | 2001-167797 | 6/2001 |
| JP | 2003-132893 | 5/2003 |
| JP | 2003-282061 | 10/2003 |
| JP | 2003-317722 | 11/2003 |
| JP | 2005-327630 | 11/2005 |
| JP | 2008-293719 | 12/2008 |
| JP | 2009-205848 | 9/2009 |

* cited by examiner

*Primary Examiner* — Kenneth Douyette

(74) *Attorney, Agent, or Firm* — K&L Gates LLP

(57) ABSTRACT

A nonaqueous electrolyte secondary battery includes a positive electrode; a negative electrode; and a nonaqueous electrolyte, wherein the negative electrode has a negative electrode mixture layer including a negative electrode active material; a polymer containing vinylidene fluoride as a repeating unit; a polymer containing acrylonitrile as a repeating unit; and a vapor-grown carbon fiber; and the nonaqueous electrolyte contains a fluorocarbon based polymer compound.

13 Claims, 2 Drawing Sheets

NEGATIVE ELECTRODE COMPRISING VAPOR GROWN CARBON FIBER AND POLYMER MATERIALS AND NONAQUEOUS ELECTROLYTE SECONDARY BATTERY

CROSS REFERENCES TO RELATED APPLICATIONS

The present application claims priority to that disclosed in Japanese Priority Patent Application JP 2009-094075 filed in the Japan Patent Office on Apr. 8, 2009, the entire content of which is hereby incorporated by reference.

BACKGROUND

The present application relates to a nonaqueous electrolyte secondary battery using a negative electrode containing a binder.

In recent years, a number of portable electronic appliances such as a camera-integrated VTR (video tape recorder), a digital still camera, a mobile phone, a personal digital assistant and a laptop computer, each achieving a reduction in size and weight, have appeared. With respect to batteries, in particular, secondary batteries as a portable power source for such electronic appliances, intensive studies have been conducted for the purpose of enhancing the energy density.

Of secondary batteries, a lithium ion secondary battery has a structure in which a positive electrode and a negative electrode are laminated or wound via, as a diaphragm, a resin thin film separator made of polypropylene, polyethylene, etc. and includes a nonaqueous electrolyte containing an electrolyte salt and a nonaqueous solvent in the inside thereof.

There are known lithium ion secondary batteries which are provided with a positive electrode using, for example, an aluminum foil as a positive electrode collector, $LiCoO_2$ as a positive electrode active material, graphite as a conductive agent and polyvinylidene fluoride, TEFLON (a registered trademark), etc. as a binder; and a negative electrode using, for example, a copper foil as a negative electrode collector, amorphous carbon, coke, graphite, etc. as a negative electrode active material and polyvinylidene fluoride, polyacrylonitrile, a styrene-butadiene rubber, etc. as a binder (see, for example, JP-A-8-315817, JP-B-7-70319, JP-A-2003-282061, JP-A-2003-317722, Japanese Patent No. 2548460 and JP-A-2003-132893).

Also, there is proposed a polymer lithium ion secondary battery containing a polymer such as polyvinylidene fluoride, polyacrylonitrile and polyethylene oxide as an electrolyte of a lithium ion secondary battery. In particular, in view of the fact that a gel electrolyte battery using a gel electrolyte which has been solidified by incorporating an electrolytic solution into a polymer is free from liquid leakage of the electrolytic solution and high in reliability, the gel electrolyte battery is widely put into practical use. In the gel electrolyte battery, electrolytes existing in the inside of an electrode and between an electrode and a separator are immobilized, and the locations of battery members are fixed.

The polymer lithium ion secondary battery is lightweight because an aluminum laminated film can be used for an exterior thereof; and in the polymer lithium ion secondary battery, it is possible to prepare a thin and large-area battery which is hardly processed when a metal can exterior is used (see, for example, JP-A 2001-167797).

SUMMARY

It may be said that the most important characteristics as a secondary battery are "capacity" which is linked directly with duration and "cycle characteristic" of cycle life for which the battery can be used over a long time. In an electrode of a lithium battery, since an active material is a powder, this is coated and immobilized on a collector with a polymer binder. However, since this binder does not contribute to the battery capacity, it is desirable that a volume of the binder is as small as possible. Also, since the binder covers a reactive site of the active material, large-current charge and discharge characteristics become worse. When the charge and discharge characteristics are reduced, the cycle life is also lowered.

However, in the case where the amount of the binder is too small, not only the active material peels off and falls from the collector, resulting in interfering with a manufacturing process, but the cycle characteristic of the secondary battery becomes worse. Since the battery active material causes a volume change due to deintercalation and intercalation of lithium following the charge and discharge, when the amount of the binder is too small, the electrical contact of active material particles becomes worse, and the capacity decreases along with the cycle characteristic.

Namely, while the binder is required to be used in a minimal amount at which sufficient mechanical strength can be ensured, it would be better that the amount of the binder is as small as possible in view of electrical characteristic and chemical characteristic. Actually, while it is desirable that the amount of the binder is small in view of characteristics, since there is no process adaptability, it is the actual circumstances that the amount of the binder cannot help being increased.

Furthermore, an electrode involves a problem regarding electron conductivity in addition to binding properties. The electrode is demanded to have high electron conductivity. Carbon materials which are used for a negative electrode of lithium ion batteries have electron conductivity. However, graphite or the like with a high degree of crystallinity is high in electron conductivity, whereas amorphous carbon is low in electron conductivity. That is, even in graphite based carbon materials, in the case where an amorphous layer is provided on the surface, the electron conductivity is not always sufficient.

On that occasion, it is well known to add a carbon fiber to the electrode. Specifically, a vapor-grown carbon fiber (VGCF) is a well known material. When VGCF is added, the electron conductivity of the electrode is enhanced, and the capacity, large-current discharge, cycle life and so on of a battery are enhanced. Since VGCF is a bulky material, the absorbency of an electrolytic solution is also improved.

However, because of bulkiness, when VGCF is excessively charged, filling properties of the electrode are lowered, and volume efficiency is lowered, resulting in a reduction of a volume energy density of the battery. Also, since VGCF has a large surface area, the amount of the binder increases, and there is a concern that the volume energy density is more lowered.

When the amounts of bulky VGCF and the binder increase, the amount of a solvent also increases. When the amount of the solvent increases, sufficient drying cannot be achieved, and the productivity is lowered, unless the coating speed is decreased.

In other words, in order to prepare a battery capable of revealing excellent characteristics, the amounts of the binder and the conductive agent are important.

When the amount of the binder is too small, the battery active material peels off and falls from the collector. On the contrary, where the amount of the binder is too large, the amount of the solvent increases so that peel strength cannot be kept high, unless the coating speed is made slow in the manufacturing process. When the amount of the conductive agent is too small, the electron conductivity of the electrode is low, and the battery characteristics become worse. On the contrary, when the amount of the conductive agent is too large, though the large-current discharge, the cycle characteristic and the like are excellent, the volume energy density decreases. Also, since the amount of the binder increases, there are further brought a lowering of the volume energy density and a lowering of the electrode productivity.

The present application addresses the above-identified and other problems associated with conventional secondary batteries. According to an embodiment of the present invention, there is provided a secondary battery which is excellent in high capacity and long life and in which even when the amount of the binder is made low as far as possible, high peel strength is obtainable. In particular, an embodiment according to the present invention is effective for a nonaqueous electrolyte battery in which an electrode contains VGCF, and an electrolytic solution contains a fluorocarbon based polymer.

That is, according to embodiments, there are provided the following negative electrode and nonaqueous electrolyte secondary battery.

[1] A negative electrode having a negative electrode mixture layer including a negative electrode active material; a polymer containing vinylidene fluoride as a repeating unit; a polymer containing acrylonitrile as a repeating unit; and a vapor-grown carbon fiber.

[2] A nonaqueous electrolyte secondary battery including a positive electrode, a negative electrode and a nonaqueous electrolyte, wherein the negative electrode has a negative electrode mixture layer including a negative electrode active material; a polymer containing vinylidene fluoride as a repeating unit; a polymer containing acrylonitrile as a repeating unit; and a vapor-grown carbon fiber; and the nonaqueous electrolyte contains a fluorocarbon based polymer compound.

In an embodiment according to an embodiment, the negative electrode is prepared by coating a negative electrode mixture coating film including a negative electrode active material, a binder and a conductive agent on a collector. In this negative electrode, polyvinylidene fluoride (PVdF) is used chiefly for the binder, to which is added a small amount of polyacrylonitrile (PAN). According to this PAN, even when the total amount of the binder is small, high peel strength is obtainable.

An embodiment is especially effective for an electrode including a vapor-grown carbon fiber (VGCF) capable of enhancing electron conductivity of the negative electrode and a secondary battery.

Furthermore, this technology is especially effective for an electrolyte battery in which an electrolytic solution contains a polymer compound such as polyvinylidene fluoride. The electrolyte and the electrode active material particle may not react with an active material particle in which a chemical species in a solution (inclusive of a solution to be held in a polymer compound) is solid, unless favorable adhesion is kept. At that time, when the gel electrolyte and the binder of the electrode are polymers containing the same repeating unit each other, favorable adhesion is revealed.

Additional features and advantages are described herein, and will be apparent from the following Detailed Description and the figures.

DETAILED DESCRIPTION

The present application will be described in detail with reference to the accompanying drawings according to an embodiment.

Figure 1:
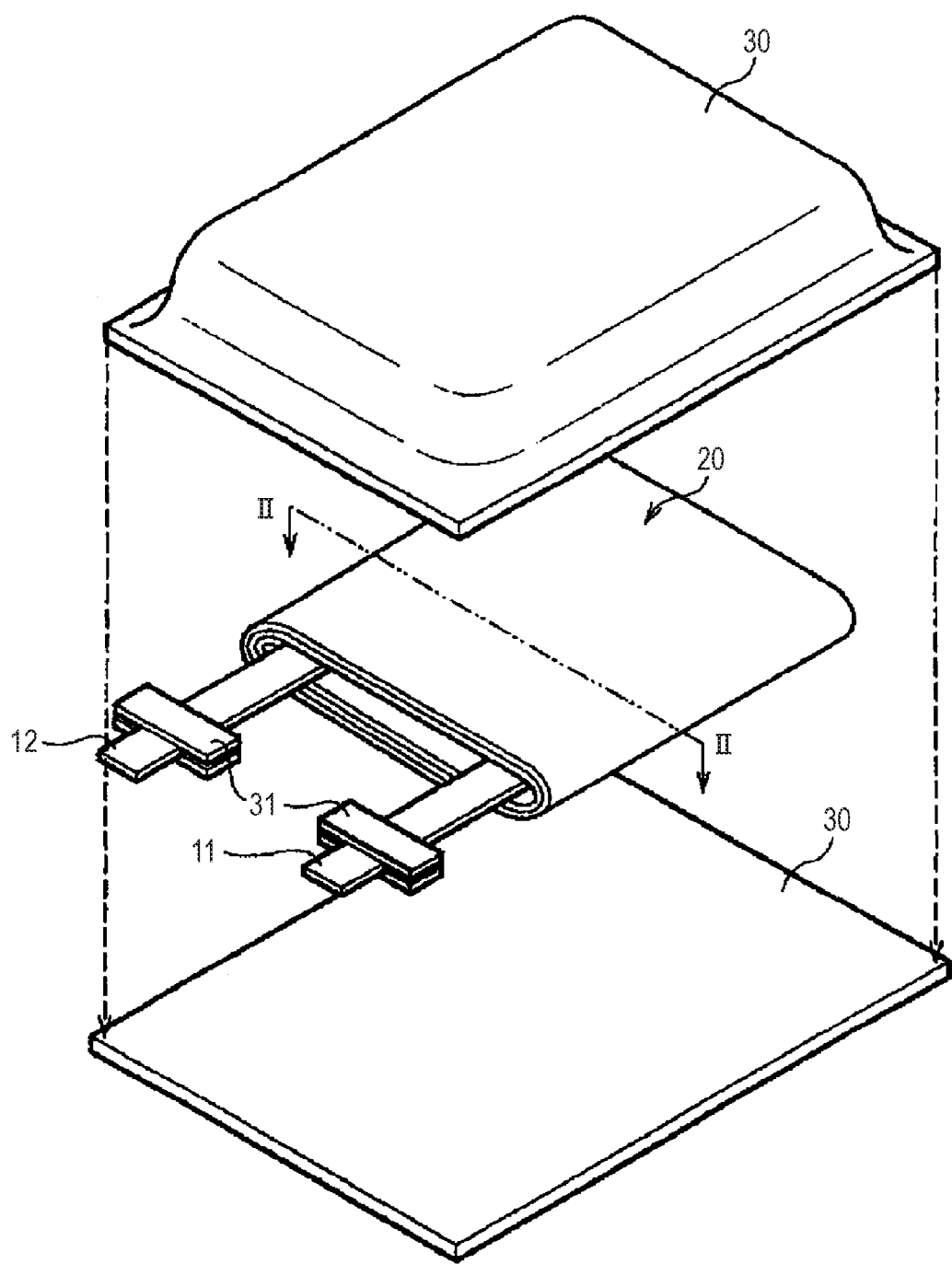
FIG. 1 is an exploded perspective view showing an example of a laminate type secondary battery which is a nonaqueous electrolyte secondary battery according to an embodiment.

FIG. 1 is an exploded perspective view showing an example of a laminate type secondary battery which is a nonaqueous electrolyte secondary battery according to an embodiment. As shown in FIG. 1, this secondary battery is constituted such that a battery element 20 having a negative electrode terminal 11 and a positive electrode terminal 12 installed therein is enclosed in the inside of an exterior member 30 in a film form. The negative electrode terminal 11 and the positive electrode terminal 12 are led out from the inside toward the outside of the exterior member 30 in, for example, the same direction, respectively. The negative electrode terminal 11 is, for example, constituted of a metal material such as copper (Cu) and nickel (Ni). The positive electrode terminal 12 is, for example, constituted of a metal material such as aluminum (Al).

The exterior member 30 is, for example, constituted of a rectangular laminated film prepared by sticking a nylon film, an aluminum foil and a polyethylene film in this order. The exterior member 30 is, for example, disposed such that the polyethylene film side and the battery element 20 are opposed to each other, and respective outer peripheries are joined to each other by means of fusion or with an adhesive. A contact film 31 is inserted between the exterior member 30 and each of the negative electrode terminal 11 and the positive electrode terminal 12 for the purpose of preventing invasion of the outside air from occurring. The contact film 31 is constituted of a material having adhesion to each of the negative electrode terminal 11 and the positive electrode terminal 12. For example, in the case where each of the negative electrode terminal 11 and the positive electrode terminal 12 is constituted of the foregoing metal material, it is preferable that the contact film 31 is constituted of a polyolefin resin such as polyethylene, polypropylene, modified polyethylene and modified polypropylene.

The exterior member 30 may be constituted of a laminated film having other structure, for example, a metal material-free laminated film, a polymer film such as polypropylene, a metal film or the like, in place of the foregoing laminated film. Here, a general constitution of the exterior member can be represented by a laminated structure of (exterior layer)/(metal foil)/(sealant layer) (however, each of the exterior layer and the sealant layer may be constituted of plural layers). In the foregoing example, the nylon film is corresponding to the exterior layer; the aluminum foil is corresponding to the metal foil; and the polyethylene film is corresponding to the sealant layer. The metal foil is enough to function as a moisture permeation resistant barrier film, and not only an aluminum foil but a stainless steel foil, a nickel foil, a plated iron foil and the like can be used. Of these, an aluminum foil which is thin, lightweight and excellent in processability can be suitably used.

When a constitution which can be used as the exterior member is enumerated in a mode of (exterior layer)/(metal foil)/(sealant layer), there are exemplified Ny (nylon)/Al (aluminum)/CPP (cast polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low density polyethylene), PET/PE/Al/PET/LDPE (low density polyethylene) and PET/Ny/Al/LDPE/CPP.

Figure 2:
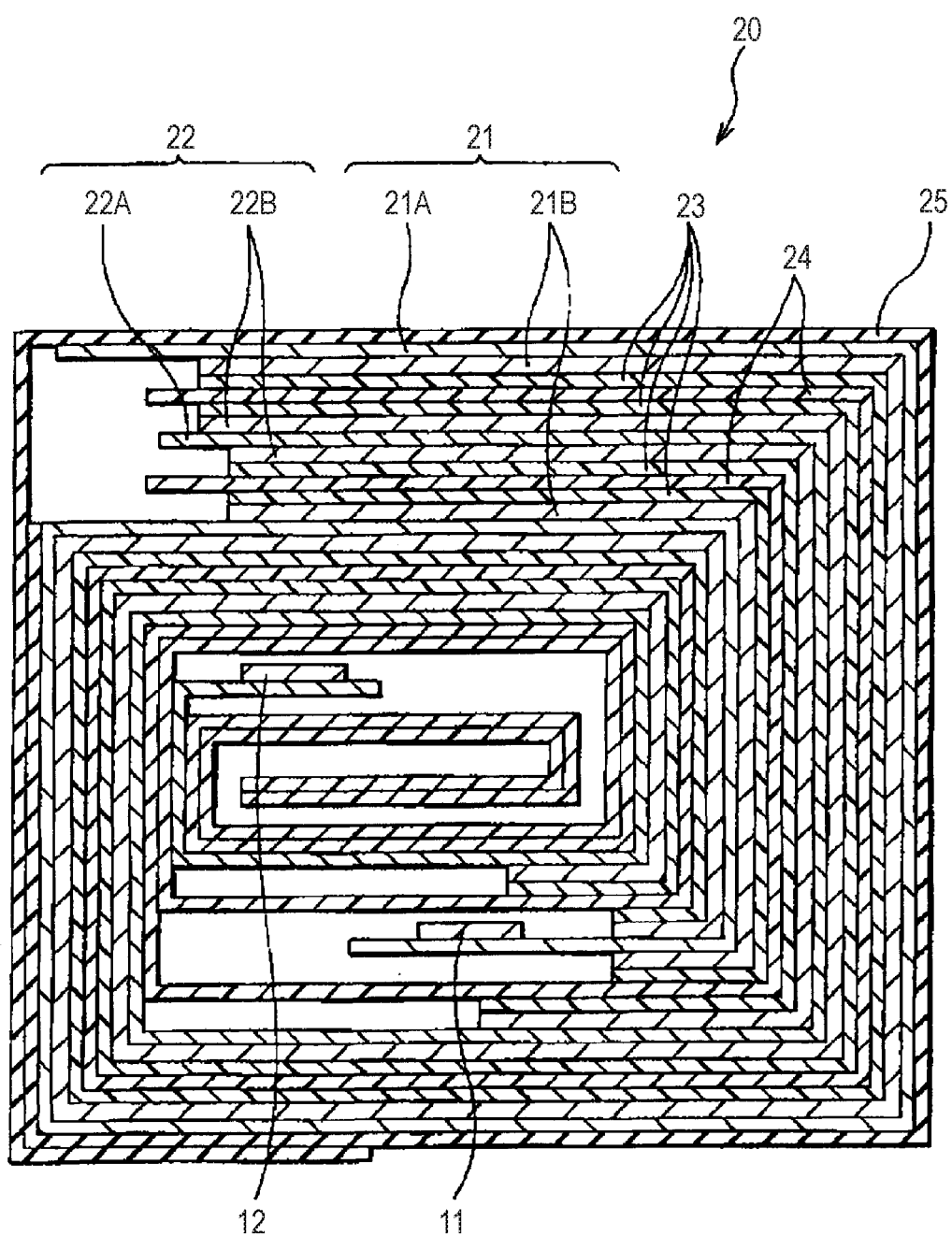
FIG. 2 is a schematic sectional view along an II-II line of a battery element shown in FIG. 1.

FIG. 2 is a schematic sectional view along an II-II line of the battery element 20 shown in FIG. 1. In FIG. 2, in the battery element 20, a negative electrode 21 and a positive electrode 22 are located opposite to each other via a gel nonaqueous electrolyte layer 23 composed of a gel nonaqueous electrolyte and a separator 24 and wound, and an outermost peripheral part of the battery element 20 is protected by a protective tape 25. The electrodes may be opposed every piece, may be formed in a zigzag pattern, or may take a winding structure. In the case of winding, when a mixture layer is formed on the both surfaces of a collector, the volume efficiency can be improved.

[Negative Electrode]

Here, the negative electrode 21 has, for example, a structure in which a negative electrode mixture layer 21B is provided on the both surfaces or one surface of a negative electrode collector 21A having a pair of surfaces opposing to each other. The negative electrode collector 21A includes an exposed portion without being provided with the negative electrode mixture layer 21B in one end in a longitudinal direction, and the negative electrode terminal 11 is installed in this exposed portion. The negative electrode collector 21A is, for example, constituted of a metal foil such as a copper foil, a nickel foil and a stainless steel foil.

The negative electrode mixture layer 21B includes, as a negative electrode active material, any one kind or two or more kinds of a negative electrode material capable of intercalating and deintercalating a lithium ion and metallic lithium and, as a binder, polyvinylidene fluoride and polyacrylonitrile and may include a conductive agent, if desired. Also, an areal density of the negative electrode mixture layer 21B is preferably 15 mg/cm$^2$ or more, and more preferably 20 mg/cm$^2$ or more on the both surfaces.

An embodiment according to the present invention is advantageous in view of manufacture efficiency because the amount of a solvent may be small. For that reason, it is possible to suppress a lowering of the manufacture efficiency to be caused in the case of increasing the areal density. Then, even a negative electrode with a high areal density as described above can be manufactured while preventing a lowering of the manufacture efficiency from occurring, and a battery with a high energy density can be obtained.

Also, according to an embodiment of the present invention, even a battery in which a negative electrode mixture layer is coated thick can be manufactured with high productivity, and therefore, the energy density can be increased.

When the areal density is low, an increase of the energy density as a whole of the battery becomes small, whereby it may be difficult to sufficiently bring the effects according to an embodiment of the present invention. In consequence, in order to sufficiently obtain an increasing effect of the energy density according to an embodiment of the present invention, the high areal density as described previously is preferable.

Examples of the negative electrode material capable of intercalating and deintercalating lithium or the like include carbon materials, metals or metal oxides, silicon and polymer materials. As the carbon material, any one kind or two or more kinds of carbon materials, such as hardly graphitized carbon, easily graphitized carbon, graphites, pyrolytic carbons, cokes, vitreous carbons, organic polymer compound baked materials, carbon fibers and active carbon, can be used.

In particular, graphites such as natural graphite and artificial graphite are widely used for lithium ion batteries because they are rich in chemical stability, able to stably cause repeatedly a deintercalation and intercalation reaction of a lithium ion and easily available industrially.

Examples of other materials than carbon include metal elements or semi-metal elements, for example, magnesium (Mg), boron (B), aluminum (Al), gallium (Ga), indium (In), silicon (Si), germanium (Ge), tin (Sn), etc., each of which is able to form an alloy with lithium. These materials may be crystalline or amorphous.

Besides, silicon belonging to the Group 4B and the like are known as a material capable of intercalating and deintercalating Li. Tin or silicon can be utilized as an oxide or carbide containing oxygen or carbon. Examples of the polymer material include polyacetylene and polypyrrole.

It is also possible to realize the negative electrode material by mixing the foregoing materials, for example, a combination of a graphite material and tin oxide.

The negative electrode mixture layer further includes a polymer containing vinylidene fluoride (VdF) as a repeating unit and a polymer containing acrylonitrile (AN) as a repeating unit. These polymers function as a binder. Also, it is preferable to use these polymers upon being mixed with each other. This is because even when the mixture is coated at a high speed, high peel strength can be kept. Also, what a PVdF based polymer is used as a binder of the electrode is extremely effective during the use of a PVdF based polymer for the gel electrolyte, too. According to this, the electrode and the gel electrolyte become integrated, thereby forming a favorable ionically conductive interface.

A total content of the polymer binder including the polymer containing vinylidene fluoride as a repeating unit and the polymer containing acrylonitrile as a repeating unit in the negative electrode mixture layer is preferably from 2.5 to 8% by mass, and more preferably from 3 to 5% by mass. When the total content of the polymer binder in the negative electrode mixture layer falls within the foregoing range, it is possible to contrive to make both sufficient adhesion and high battery performance compatible with each other.

A content of the polymer containing acrylonitrile (AN) as a repeating unit is preferably from 1 to 20% by mass (corresponding to from 0.025 to 1.6% by mass in the negative electrode mixture layer), and more preferably from 2 to 10% by mass (corresponding to from 0.05 to 0.8% by mass in the negative electrode mixture layer) relative to the total content of the polymer containing vinylidene fluoride as a repeating unit and the polymer containing acrylonitrile as a repeating unit. When the content of the polymer containing acrylonitrile (AN) as a repeating unit falls within the foregoing range, it is possible to contrive to make both the effect of the PVdF based polymer as a main binder and the effect of the PAN based polymer compatible with each other.

Also, each of the polymers to be used for the binder may be a homopolymer composed of a single repeating unit or may be a copolymer.

Examples of the polymer containing vinylidene fluoride (VdF) as a repeating unit include polyvinylidene fluoride (PVdF) and a copolymer composed of vinylidene fluoride as a component. Specific examples of the copolymer include a vinylidene fluoride-hexafluoropropylene copolymer, a vinylidene fluoride-tetrafluoroethylene copolymer, a vinylidene fluoride-carboxylic acid copolymer and a vinylidene fluoride-hexafluoropropylene-carboxylic acid copolymer. Examples of the vinylidene fluoride-hexafluoropropylene-carboxylic acid copolymer include a vinylidene fluoride-hexafluoropropylene-monomethyl maleate copolymer.

As the polymer containing acrylonitrile (AN) as a repeating unit, in addition to polyacrylonitrile (PAN), copolymerized PANs having an acrylate group or an acrylamide group can be used.

For the binder, a single kind of the foregoing polymer may be used alone, or a mixture of two or more kinds of the foregoing polymers may be used.

The negative electrode mixture layer further includes a vapor-grown carbon fiber (VGCF). According to this, the electron conductivity of the electrode is enhanced, and the large-current charge and discharge characteristics and the repeated charge and discharge life (cycle characteristic) of the battery are improved. As the vapor-grown carbon fiber, one having an average fiber diameter of 150 nm and an average fiber length of from 10 to 20 μm can be used. Also, a content of the vapor-grown carbon fiber in the negative electrode mixture layer is preferably from 1 to 5% by mass, and more preferably from 2 to 3.5% by mass. When the content of the vapor-grown carbon film in the negative electrode mixture layer falls within the foregoing range, it is possible to realize a high performance without bringing a lowering of the capacity to be caused due to bulkiness.

The negative electrode can be, for example, manufactured in the following manner.

First of all, for example, a negative electrode active material, a conductive agent and a binder prepared by mixing PVdF and PAN in a ratio of 95/5 are dispersed in a solvent such as N-methyl-2-pyrrolidone (NMP) to prepare a negative electrode mixture slurry. Subsequently, this negative electrode mixture slurry is coated on a negative electrode collector and dried to remove the solvent, and the resultant is subjected to compression molding by a roll press or the like and then cut in a prescribed size. If desired, a lead wire for taking out a current is welded with this electrode.

Also, a peel strength between the negative electrode collector and the negative electrode mixture layer is preferably 4 mN/mm or more, and especially preferably 5 mN/mm or more. According to this, the adhesion between the negative electrode collector and the negative electrode mixture layer is enhanced, and the cycle characteristic is enhanced even under a high-temperature circumstance.

The peel strength is an average value of a force per 1 mm which is considered to be necessary for peeling when the negative electrode is dipped in NMP at 80° C. for one hour, taken out and dried, followed by sticking of an adhesive tape thereonto, the adhesive tape-stuck negative electrode is disposed on a support table, and the adhesive tape is then pulled in a 180° direction at a rate of 10 cm/min to peel off the negative electrode collector.

[Positive Electrode]

On the other hand, similar to the negative electrode 21, the positive electrode 22 has, for example, a structure in which a positive electrode mixture layer 22B is provided on the both surfaces or one surface of a positive electrode collector 22A having a pair of surfaces opposing to each other. The positive electrode collector 22A includes a portion where the positive electrode mixture layer 22B is exposed without being covered in one end in a longitudinal direction, and the positive electrode terminal 12 is installed in this exposed portion. The positive electrode collector 22A is, for example, constituted of a metal foil such as an aluminum foil.

For example, the positive electrode mixture layer 22B includes, as a positive electrode active material, a positive electrode material capable of intercalating and deintercalating a lithium ion and may further include a conductive agent and a binder, if desired. Here, it is preferable that the positive electrode active material, the conductive agent and the binder are uniformly dispersed. Also, a mixing ratio thereof does not matter.

As the positive electrode active material, a material capable of reversibly deintercalating and intercalating a lithium ion and having a reaction potential of from 3 to 4.5 V relative to lithium is useful. $LiCoO_2$ is most frequently used, and besides, $LiMn_2O_4$, $LiNiO_2$ and $LiFePO_4$ are frequently used. A mixture of plural kinds of these materials is often used. Also, of these materials, a material composed of a solid solution with other metal species, such as $LiCO_{1-x-y}Al_xMg_yO_2$, is frequently used.

Since the positive electrode active material is low in electron conductivity, it is preferable to mix it with a carbon powder as a conductive assistant. Since the positive electrode is in an oxidative atmosphere, in many cases, a metal is not used. However, an aluminum powder can be used. Similar to the negative electrode, the positive electrode is used by mixing the active material and the conductive agent with the binder, dissolving the mixture in a solvent such as NMP to prepare a slurry and coating the slurry on the collector, followed by drying, pressing, slitting and welding with the lead. Since the positive electrode is in a severe oxidative atmosphere, the metal of the foil or lead is restricted. In general, an aluminum foil is used. Aluminum is a suitable material which is passivated to become insoluble and which is good in electric conductivity, lightweight, inexpensive, soft and rich in processability.

[Nonaqueous Electrolyte Layer]

The nonaqueous electrolyte layer 23 includes, for example, an electrolytic solution and a matrix polymer compound which serves as a holding body for holding this electrolytic solution and is in a so-called gel form. In the obtained battery, it is possible to effectively suppress liquid leakage of the nonaqueous electrolyte from occurring by swelling, gelation or non-fluidization of such a matrix polymer compound.

As the nonaqueous electrolytic solution, those which are generally used for lithium ion secondary batteries can be used. As such a nonaqueous electrolytic solution, one obtained by dissolving an electrolyte salt in a nonaqueous solvent can be used.

A carbonate is useful for the nonaqueous solvent. Specific examples thereof include ethylene carbonate, propylene carbonate, dimethyl carbonate, ethyl methyl carbonate and diethyl carbonate. Besides, lactones such as γ-butyrolactone and γ-valerolactone and carboxylates such as ethyl acetate are useful.

Examples of the electrolyte salt which can be used include $LiPF_6$, $LiBF_4$ and imide salts. These materials may be used singly or in admixture of plural kinds thereof. Of these, $LiPF_6$ is most frequently used. A concentration of the electrolyte salt in the electrolytic solution is preferably from 0.5 to 1.5 moles/kg.

For example, as the matrix polymer compound, a fluorocarbon based polymer compound such as polyvinylidene fluoride and a copolymer of vinylidene fluoride and hexafluoropropylene is preferable. Of these, a copolymer of vinylidene fluoride and hexafluoropropylene containing from 3 to 7.5% by mass of hexafluoropropylene is preferable from the viewpoint of redox stability.

[Separator]

Also, the separator 24 is, for example, constituted of an insulating thin film having large ion permeability and prescribed mechanical strength, such as a porous film composed of a polyolefin based organic resin (for example, polypropylene, polyethylene, etc.) and a porous film composed of an inorganic material (for example, a ceramic-made nonwoven fabric, etc.), and may have a structure in which two or more kinds of such a porous film are laminated. In particular, one including a polyolefin based porous film is suitable because it is excellent in separability between the negative electrode 21 and the positive electrode 22 and is able to more reduce an internal short circuit or a lowering of the open-circuit voltage.

[Manufacturing Method]

Next, an example of the manufacturing method of the foregoing nonaqueous electrolyte secondary battery is described.

The foregoing laminate type secondary battery can be manufactured in the following manner. First of all, the negative electrode 21 is prepared. For example, in the case of using a granular negative electrode active material, the negative electrode active material is mixed with the foregoing binder and conductive agent to prepare a negative electrode mixture, which is then dispersed in a dispersion medium such as N-methyl-2-pyrrolidone to prepare a negative electrode mixture slurry. Subsequently, this negative electrode mixture slurry is coated on the negative electrode collector 21A, dried and then subjected to compression molding to form the negative electrode mixture layer 21B.

Also, the positive electrode 22 is prepared. For example, in the case of using a granular positive electrode active material, the positive electrode active material is mixed with a conductive agent and a binder, if desired, to prepare a positive electrode mixture, which is then dispersed in a dispersion medium such as N-methyl-2-pyrrolidone to prepare a positive electrode mixture slurry. Thereafter, this positive electrode mixture slurry is coated on the positive electrode collector 22A, dried and then subjected to compression molding to form the positive electrode mixture layer 22B.

Subsequently, not only the negative electrode terminal 11 is installed in the negative electrode 21, but the positive electrode terminal 12 is installed in the positive electrode 22. At that time, the protective tape 25 may be stuck on a welded part of the negative electrode terminal 11 or positive electrode terminal 12 and the back side thereof, or on the collector of a boundary portion between the mixture-coated portion and the collector-exposed portion.

Subsequently, the nonaqueous electrolyte layer 23 is formed on one surface or both surfaces of the obtained negative electrode 21. For example, an electrolyte salt such as lithium hexafluorophosphate, a nonaqueous solvent such as ethylene carbonate and propylene carbonate and a matrix polymer such as polyvinylidene fluoride are mixed with and dissolved in a diluent solvent such as dimethyl carbonate (DMC), thereby preparing a nonaqueous electrolyte in a sol form. This nonaqueous electrolyte in a sol form is coated on the negative electrode 21, and the diluent solvent is evaporated off to form the nonaqueous electrolyte layer 23 composed of a gel nonaqueous electrolyte.

Furthermore, the nonaqueous electrolyte layer 23 is formed on one surface or both surfaces of the obtained positive electrode 22. For example, an electrolyte salt such as lithium hexafluorophosphate, a nonaqueous solvent such as ethylene carbonate and propylene carbonate and a matrix polymer such as polyvinylidene fluoride are mixed with and dissolved in a diluent solvent such as dimethyl carbonate (DMC), thereby preparing a nonaqueous electrolyte in a sol form. This nonaqueous electrolyte in a sol form is coated on the positive electrode 22, and the diluent solvent is evaporated off to form the nonaqueous electrolyte layer 23 composed of a gel nonaqueous electrolyte.

Thereafter, the separator 24, the positive electrode 22 having the nonaqueous electrolyte layer 23 formed thereon, the separator 24 and the negative electrode 21 having the nonaqueous electrolyte layer 23 formed thereon are successively laminated and wound, and the protective tape 25 is allowed to adhere to an outermost peripheral part of the wound body, thereby forming the battery element 20. Furthermore, this battery element 20 is packed by the exterior member 30, thereby completing the laminate type secondary battery shown in FIGS. 1 and 2.

This nonaqueous electrolyte secondary battery may also be manufactured in the following manner. For example, the completed battery element is not packed by the exterior member; but the nonaqueous electrolyte layer 23 may be formed by coating a monomer or polymer of the matrix polymer on the negative electrode 21 and the positive electrode 22 or the separator 24 and winding to prepare a wound electrode body, housing the wound electrode body in the inside of the exterior member 30 and then injecting the foregoing nonaqueous electrolytic solution thereinto. However, what the monomer is polymerized in the inside of the exterior member 30 is preferable because welding properties between the nonaqueous electrolyte layer 23 and the separator 24 are enhanced, thereby enabling one to make the internal resistance low. Also, what the nonaqueous electrolytic solution is injected into the inside of the exterior member 30 to form a gel aqueous electrolyte is preferable because the nonaqueous electrolyte secondary battery can be simply manufactured by a smaller number of steps.

In the secondary battery which has been described above, when charged, a lithium ion is deintercalated from the positive electrode mixture layer 22B and intercalated into the negative electrode mixture layer 21B via the nonaqueous electrolyte layer 23. When discharged, a lithium ion is deintercalated from the negative electrode mixture layer 21B and intercalated into the positive electrode mixture layer 22B via the nonaqueous electrolyte layer 23.

EXAMPLES

Specific working examples according to an embodiment are hereunder described in detail.

<Preparation of Negative Electrode>

First of all, a binder and a solvent were mixed to prepare a polymer solution of the binder. A negative electrode active material and additives were added thereto and mixed to prepare a paint, which was then coated on a copper foil collector, and the solvent was subsequently dried. After roll pressing, the resultant was cut in a prescribed width, and a nickel-made terminal was installed in an end thereof, thereby preparing a negative electrode.

For the negative electrode active material, an artificial graphite, mesophase carbon microbead having an average particle size of 20 μm was used.

For the conductive agent, a vapor-grown carbon fiber (VGCF) having an average fiber diameter of 150 nm and an average fiber length of from 10 to 20 μm was used.

For the binders of Examples 1 to 19 and Comparative Examples 1 to 3, a copolymer of vinylidene fluoride (VdF) and monomethyl maleate (MMM) (weight ratio: 99/1) having a number average molecular weight of 800,000 and polyacrylonitrile (PAN) were used.

For the binders of Examples 20 to 22, a copolymer of vinylidene fluoride (VdF) and monomethyl maleate (MMM) (weight ratio: 98/2) having a number average molecular weight of 700,000 and polyacrylonitrile (PAN) were used while changing a ratio of PVdF and PAN.

A weight ratio of the graphite to the binder was set up at 95/5.

For the collector, a copper foil having a thickness of 15 µm was used.

The negative electrode layer was formed on the both surfaces of the collector in a thickness of 50 µm per each side. Coating was carried out at a rate of 30 m/min.

The experiment was performed and studied while changing a blending ratio of the binder. The blending ratio is shown in the following Tables 1 and 2.

<Preparation of Positive Electrode>

$LiCoO_2$, graphite as a conductive agent and polyvinylidene fluoride as a binder were dispersed in N-methyl-2-pyrrolidone as a solvent, thereby preparing a positive electrode mixture slurry. Thereafter, this positive electrode mixture slurry was uniformly coated on a positive electrode collector made of an aluminum foil having a thickness of 20 µm and then dried, and the resultant was subjected to compression molding to form a positive electrode mixture layer, which was then cut in a necessary size to prepare a positive electrode. On that occasion, $LiCoO_2$, graphite and polyvinylidene fluoride were mixed in a mass ratio of $LiCoO_2$ to graphite to polyvinylidene fluoride of 91/6/3. Thereafter, an aluminum-made positive electrode terminal was installed in one end of the positive electrode collector.

<Gel Electrolyte>

A gel electrolyte was prepared in the following manner.

For a matrix polymer, a copolymer of vinylidene fluoride (VdF) and hexafluoropropylene (HFP) in a ratio of VdF to HFP of 93/7 and having a number average molecular weight of 700,000 was used. For an electrolytic solution, $LiPF_6$ was dissolved in a weight molar concentration of 1 mole/kg in a mixed solvent of ethylene carbonate (EC) and propylene carbonate (PC) in a mass ratio of EC to PC of 4/6. For a diluent solvent, dimethyl carbonate (DMC) was used. The polymer, the electrolytic solution and the diluent solvent were mixed in a ratio of 1/10/10 and stirred at 90° C. to prepare a polymer solution, thereby obtaining a gel electrolyte. This sol was coated on the electrode, and the diluent DMC was evaporated off to form a gel electrolyte film having a thickness of 20 µm on the electrode.

<Assembling>

The positive electrode and the negative electrode each having this gel electrolyte film formed thereon were wound flat while intervening a 10 µm-thick porous polyethylene separator therebetween, thereby preparing a battery element. This battery element was inserted into an exterior using an aluminum laminated film and enclosed. The aluminum laminated film is prepared by using nylon for an external layer and crystalline polypropylene for an interior and sticking each of the films in a thickness of 30 µm thereto. The battery element was inserted thereinto, and rectangular three sides thereof were stuck in vacuo to each other by means of heat fusion, followed by sealing in vacuo. The aluminum laminated film is an exterior such that even when pressed by atmospheric pressure, it does not cause slack. In a portion from which the terminal of the battery is taken out, a resin piece capable of well adhering to a metal, such as an ionomer, was allowed to adhere and prepared with high airtightness.

<Evaluation of Characteristics>

Peel Strength Test of Electrode:

A peel strength test of the coating film of the electrode after completion of coating was carried out. When an adhesive tape is stuck and peeled apart from the electrode, the adhesive tape can be peeled apart from an interface between the copper foil and the coating film. A half of the tape length was peeled and reversed herein at 180°. A copper foil-exposed portion and the adhesive tape were pulled by a tensile tester (Shimadzu Autograph AGS-50B, manufactured by Shimadzu Corporation), thereby measuring a peel strength. Goods having a peel strength of 40 N/m or more were defined as an article of good quality.

Volume Energy Density of Battery:

The battery was charged by means of constant current constant voltage charge with 1 ItA at 4.2 V for 2.5 hours (this being defined as standard charge) and then subjected to constant current discharge with 0.2 ItA to 3 V, thereby measuring a battery capacity. The battery capacity was multiplied by an average discharge voltage to determine a discharge watt-hour, and this was divided, by a volume of the battery to calculate a volume energy density. It is preferable that this numerical value is as large as possible, and goods having a volume energy density of 480 Wh/L or more were defined to be an article of good quality.

Though the larger the content of VGCF, the higher the conductivity of the electrode is, when the content of VGCF is large, the volume energy density becomes small. In the batteries of the Examples and Comparative Examples, since the electrode is prepared upon being pressed by the same pressure, the larger the content of bulky VGCF, the thicker the electrode is. Since the film is used for the exterior of the battery, the battery is deformed to some extent. Accordingly, when the electrode is thick, the volume of the battery increases, and the energy density is lowered. When the content of VGCF is small, the discharge performance is poor, and the battery capacity is lowered, resulting in a lowering of the energy density.

Cycle Test:

The prepared secondary battery was subjected to a charge and discharge test, and a cycle characteristic was examined in the following manner First of all, the battery was subjected to constant current constant voltage charge with 1 ItA to 4.2 V at 23° C. for 2.5 hours and subsequently subjected to constant current discharge with 1 ItA to a cut-off voltage of 3.0 V. This charge and discharge operation was repeated, thereby determining a discharge capacity retention rate at the 400th cycle relative to the discharge capacity at the first cycle. At that time, goods with a retention rate of 70% or more of the initial value were defined as an article of good quality. The term "1 ItA" is a current value at which a theoretical capacity can be released for one hour. In the present studies, since the capacity of the battery is 500 mAh, 500 mA is corresponding to 1 ItA. The term "0.2 ItA" is corresponding to 100 mA because it is a ⅕ current value.

Load Characteristic Test:

The battery was subjected to constant current constant voltage charge with 1 ItA to 4.2 V for 2.5 hours and subsequently subjected to constant current discharge with 0.21 ItA to 3.0 V, thereby measuring a discharge capacity. The obtained result was compared with the measurement result obtained in the same manner with 3 ItA.

Goods having a (capacity with 3 ItA)/(capacity with 0.2 ItA) ratio of 80% or more were defined as an article of good quality.

TABLE 1

|  | Graphite | Binder (% by mass) | | VGCF | Total binder | Fraction (%) | | Peel strength | Energy density | Cycle | Load |
| --- | --- | --- | --- | --- | --- | --- | --- | --- | --- | --- | --- |
|  | (% by mass) | VdF-MMM | PAN | (% by mass) | (% by mass) | VdF-MMM | PAN | (N/m) | (WH/L) | (%) | (%) |
| Example 1 | 95.0% | 1.8% | 0.2% | 3.0% | 2.0% | 90% | 10% | 24 | 511 | 52% | 93% |
| Example 2 | 94.5% | 2.25% | 0.25% | 3.0% | 2.5% | 90% | 10% | 40 | 556 | 73% | 90% |
| Example 3 | 94.0% | 2.7% | 0.3% | 3.0% | 3.0% | 90% | 10% | 52 | 567 | 82% | 84% |
| Example 4 | 92.0% | 4.5% | 0.5% | 3.0% | 5.0% | 90% | 10% | 63 | 574 | 77% | 81% |
| Example 5 | 89.0% | 7.2% | 0.8% | 3.0% | 8.0% | 90% | 10% | 77 | 544 | 72% | 80% |
| Example 6 | 87.0% | 9.0% | 1.0% | 3.0% | 10.0% | 90% | 10% | 94 | 500 | 63% | 77% |
| Comparative Example 1 | 93.0% | 4.0% | 0.0% | 3.0% | 4.0% | 100% | 0% | 32 | 517 | 55% | 79% |
| Example 7 | 93.0% | 3.96% | 0.04% | 3.0% | 4.0% | 99% | 1% | 54 | 547 | 70% | 83% |
| Example 8 | 93.0% | 3.8% | 0.2% | 3.0% | 4.0% | 95% | 5% | 55 | 569 | 76% | 85% |
| Example 9 | 93.0% | 3.6% | 0.4% | 3.0% | 4.0% | 90% | 10% | 58 | 586 | 80% | 84% |
| Example 10 | 93.0% | 3.2% | 0.8% | 3.0% | 4.0% | 80% | 20% | 57 | 577 | 73% | 85% |
| Example 11 | 93.0% | 3.0% | 1.0% | 3.0% | 4.0% | 75% | 25% | 59 | 512 | 66% | 83% |
| Comparative Example 2 | 96.0% | 3.8% | 0.2% | 0.0% | 4.0% | 95% | 5% | 70 | 593 | 60% | 69% |
| Example 12 | 95.0% | 3.8% | 0.2% | 1.0% | 4.0% | 95% | 5% | 62 | 581 | 70% | 80% |
| Example 13 | 93.0% | 3.8% | 0.2% | 3.0% | 4.0% | 95% | 5% | 56 | 567 | 72% | 85% |
| Example 14 | 91.0% | 3.8% | 0.2% | 5.0% | 4.0% | 95% | 5% | 48 | 557 | 76% | 89% |
| Example 15 | 90.0% | 3.8% | 0.2% | 6.0% | 4.0% | 95% | 5% | 38 | 533 | 68% | 92% |
| Comparative Example 3 | 97.0% | 2.7% | 0.3% | 0.0% | 3.0% | 90% | 10% | 70 | 529 | 60% | 69% |
| Example 16 | 95.5% | 3.15% | 0.35% | 1.0% | 3.5% | 90% | 10% | 62 | 565 | 70% | 80% |
| Example 17 | 92.8% | 3.8% | 0.4% | 3.0% | 4.2% | 90% | 10% | 56 | 572 | 72% | 85% |
| Example 18 | 90.0% | 4.5% | 0.5% | 5.0% | 5.0% | 90% | 10% | 48 | 548 | 76% | 89% |
| Example 19 | 88.0% | 5.4% | 0.6% | 6.0% | 6.0% | 90% | 10% | 38 | 515 | 68% | 92% |

TABLE 2

|  | Graphite | Binder (% by mass) | | VGCF | Total binder | Fraction (%) | | Peel strength | Energy density | Cycle | Load |
| --- | --- | --- | --- | --- | --- | --- | --- | --- | --- | --- | --- |
|  | (% by mass) | VdF-MMM | PAN | (% by mass) | (% by mass) | VdF-HFP-MMM | PAN | (N/m) | (WH/L) | (%) | (%) |
| Example 20 | 94.2% | 2.5% | 0.3% | 3.0% | 2.8% | 90% | 10% | 53 | 575 | 72% | 90% |
| Example 21 | 93.8% | 3.0% | 0.2% | 3.0% | 3.2% | 95% | 5% | 66 | 569 | 78% | 85% |
| Example 22 | 93.1% | 3.5% | 0.4% | 3.0% | 3.9% | 90% | 10% | 72 | 555 | 74% | 81% |

As is clear from the results shown in Tables 1 and 2, the peel strength could be increased by the addition of PAN even when the amount of the binder was small. In the case of not containing PAN, when the total amount of the binder was not large, the peel strength was low, peeling was caused during the process of producing an electrode, and even the preparation of a battery could not be achieved. Even when a battery could be prepared, the cycle characteristic was poor because the resulting battery could not cope with a volume change following the charge and discharge. When the total amount of the binder was large, the peel strength could be increased; however, since the content of the binder covering the electrode active material was large, the battery characteristic was deteriorated as compared with that in the case of the binder containing PAN. On the contrary, it was noted that when the ratio of PAN was excessively increased, the characteristics were lowered because an interaction with the gel electrolyte was a little. In view of this fact, it was noted that a preferred content of the polymer containing acrylonitrile as a repeating unit is from 1 to 20% by mass relative to a total content of the polymer containing vinylidene fluoride as a repeating unit and the polymer containing acrylonitrile as a repeating unit.

Also, it was noted that this effect is especially effective for the negative electrode containing VGCF. The cycle characteristic, the capacity and the current characteristics were enhanced when the negative electrode contained VGCF. Furthermore, it was noted from the foregoing results that a preferred content of the vapor-grown carbon fiber in the negative electrode mixture layer is from 1 to 5% by mass.

In the light of the above, the battery characteristics can be enhanced by the binder containing PAN.

While the present invention has been described with reference to the embodiments and working examples, it should not be construed that the present invention is limited to the foregoing embodiments and working examples, but various modifications can be made. For example, while the secondary battery having a wound structure has been described in the foregoing embodiments and working examples, the present invention is also applicable to a secondary battery having other shape using an exterior member, such as a coin type, a sheet type, a button type and a rectangular type. The present invention is also similarly applicable to a secondary battery having a laminated structure in which plural positive electrodes and negative electrodes are laminated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A negative electrode comprising:
    a negative electrode mixture layer including:
    a negative electrode active material;
    a binder comprising a polymer containing vinylidene fluoride as a repeating unit and a polymer containing acrylonitrile as a repeating unit; and
    a vapor-grown carbon fiber, wherein:
    a content of the polymer containing acrylonitrile as a repeating unit is from 1 to 20% by mass relative to a total content of the polymer containing vinylidene fluoride as a repeating unit and the polymer containing acrylonitrile as a repeating unit, and
    the polymer containing acrylonitrile as a repeating unit is selected from the group consisting of polyacrylonitrile, a copolymer having an acrylate group and a copolymer having an acrylamide group.

2. The negative electrode according to claim 1, wherein a total content of the polymer containing vinylidene fluoride as a repeating unit and the polymer containing acrylonitrile as a repeating unit is from 2.5 to 8% by mass relative to the total content of the negative electrode mixture layer.

3. The negative electrode according to claim 1, wherein a content of the vapor-grown carbon fiber in the negative electrode mixture layer is from 1 to 5% by mass relative to the total content of the negative electrode mixture layer.

4. The nonaqueous electrolyte secondary battery according to claim 1, wherein the vapor-grown carbon fiber has an average fiber diameter of 150 nm and an average fiber length of 10-20 μm.

5. The negative electrode according to claim 1, wherein a content of the vapor-grown carbon fiber in the negative electrode mixture layer is from 2 to 3.5% by mass relative to the total content of the negative electrode mixture layer.

6. The negative electrode according to claim 1, wherein the polymer containing acrylonitrile as a repeating unit is polyacrylonitrile.

7. A nonaqueous electrolyte secondary battery comprising:
    a positive electrode;
    a negative electrode; and
    a nonaqueous electrolyte, wherein
    the negative electrode has a negative electrode mixture layer including a negative electrode active material; a binder comprising a polymer containing vinylidene fluoride as a repeating unit and a polymer containing acrylonitrile as a repeating unit; and a vapor-grown carbon fiber, wherein:
    a content of the polymer containing acrylonitrile as a repeating unit is from 1 to 20% by mass relative to a total content of the polymer containing vinylidene fluoride as a repeating unit and the polymer containing acrylonitrile as a repeating unit
    the nonaqueous electrolyte contains a fluorocarbon based polymer compound, and
    the polymer containing acrylonitrile as a repeating unit is selected from the group consisting of polyacrylonitrile, a copolymer having an acrylate group and a copolymer having an acrylamide group.

8. The nonaqueous secondary electrolyte secondary battery according to claim 7, wherein a total content of the polymer containing vinylidene fluoride as a repeating unit and the polymer containing acrylonitrile as a repeating units from 2.5 to 8% by mass relative to the total content of the negative electrode mixture layer.

9. The nonaqueous electrolyte secondary battery according to claim 7, wherein a content of the vapor-grown carbon fiber in the negative electrode mixture layer is from 1 to 5% by mass relative to the total content of the negative electrode mixture layer.

10. The nonaqueous electrolyte secondary battery according to claim 7, wherein the fluorocarbon based polymer compound is a copolymer of vinylidene fluoride and hexafluoropropylene containing from 3 to 7.5% by mass of hexafluoropropylene.

11. The nonaqueous electrolyte secondary battery according to claim 7, wherein the vapor-grown carbon fiber has an average fiber diameter of 150 nm and an average fiber length of 10-20 μm.

12. The nonaqueous electrolyte secondary battery according to claim 7, wherein a content of the vapor-grown carbon fiber in the negative electrode mixture layer is from 2 to 3.5% by mass relative to the total content of the negative electrode mixture layer.

13. The nonaqueous electrolyte secondary battery according to claim 7, wherein the polymer containing acrylonitrile as a repeating unit is polyacrylonitrile.

* * * * *